(12) United States Patent
Pehlke

(10) Patent No.: US 12,107,618 B2
(45) Date of Patent: *Oct. 1, 2024

(54) CONVERGED RADIO FREQUENCY FRONT-END ARCHITECTURE

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/134,994

(22) Filed: Dec. 28, 2020

(65) Prior Publication Data

US 2021/0218434 A1 Jul. 15, 2021

Related U.S. Application Data

(60) Provisional application No. 62/958,849, filed on Jan. 9, 2020.

(51) Int. Cl.
*H04L 12/00* (2006.01)
*H04B 1/44* (2006.01)
*H04L 5/14* (2006.01)

(52) U.S. Cl.
CPC .................................. *H04B 1/44* (2013.01); *H04L 5/14* (2013.01)

(58) Field of Classification Search
None
See application file for complete search history.

(56) References Cited

U.S. PATENT DOCUMENTS

| | | | |
|---|---|---|---|
| 9,172,441 B2 | 10/2015 | Granger-Jones et al. |
| 9,385,765 B2 | 7/2016 | Wloczysiak |
| 9,485,001 B2 | 11/2016 | Wloczysiak |
| 9,571,037 B2 | 2/2017 | Wloczysiak |
| 9,621,327 B2 | 4/2017 | Chang et al. |
| 9,667,324 B2 | 5/2017 | Wloczysiak |
| 9,735,737 B2 | 8/2017 | Gorbachov et al. |
| 9,768,941 B2 | 9/2017 | Pehlke |
| 9,806,787 B2 | 10/2017 | Wloczysiak et al. |
| 9,813,137 B2 | 11/2017 | Wloczysiak et al. |
| 9,825,660 B2 | 11/2017 | Wloczysiak et al. |
| 9,893,752 B2 | 2/2018 | Domino et al. |

(Continued)

*Primary Examiner* — Noel R Beharry
*Assistant Examiner* — Lionel Preval
(74) *Attorney, Agent, or Firm* — Knobbe, Martens, Olson & Bear, LLP

(57) ABSTRACT

A switching circuit can include a first cellular filter, a second cellular filter, a first Wi-Fi filter, a second Wi-Fi filter and a plurality of switches. The first cellular filter can filter a first cellular frequency band. The second cellular filter can filter a second cellular frequency band. The first Wi-Fi filter can filter a first Wi-Fi frequency band. The first Wi-Fi frequency band is positioned between the first and the second cellular frequency bands. The second Wi-Fi filter can filter a second Wi-Fi frequency band. The second Wi-Fi frequency band is positioned between the second cellular frequency band and the first Wi-Fi frequency band. A plurality of switches can route signal from an antenna through the first cellular filter and the second Wi-Fi filter or route the signal from the antenna through the second cellular filter and the first Wi-Fi filter.

17 Claims, 8 Drawing Sheets

(56) References Cited

U.S. PATENT DOCUMENTS

| | | |
|---|---|---|
| 9,893,794 B2 | 2/2018 | Wloczysiak |
| 10,019,335 B2 | 7/2018 | Tule |
| 10,050,653 B2 | 8/2018 | Pehlivanoglu |
| 10,050,694 B2 | 8/2018 | Wloczysiak |
| 10,069,615 B2 | 9/2018 | Chang et al. |
| 10,075,199 B2 | 9/2018 | King et al. |
| 10,103,772 B2 | 10/2018 | Pehlke et al. |
| 10,122,422 B2 | 11/2018 | Wloczysiak |
| 10,135,469 B2 | 11/2018 | Chang et al. |
| 10,200,077 B2 | 2/2019 | Liu et al. |
| 10,205,490 B2 | 2/2019 | Wloczysiak |
| 10,211,857 B2 | 2/2019 | King et al. |
| 10,218,390 B2 | 2/2019 | Wloczysiak et al. |
| 10,218,427 B2 | 2/2019 | Wloczysiak |
| 10,250,191 B2 | 4/2019 | Gorbachov et al. |
| 10,256,850 B2 | 4/2019 | Wloczysiak |
| 10,256,851 B2 | 4/2019 | Pehlke et al. |
| 10,257,119 B2 | 4/2019 | Wloczysiak et al. |
| 10,374,650 B2 | 8/2019 | Pehlke et al. |
| 10,432,274 B2 | 10/2019 | Pehlke |
| 10,439,665 B2 | 10/2019 | Domino et al. |
| 10,439,685 B2 | 10/2019 | Pehlke et al. |
| 10,447,317 B2 | 10/2019 | Chang et al. |
| 10,447,442 B2 | 10/2019 | Pehlke et al. |
| 10,454,506 B2 | 10/2019 | King et al. |
| 10,484,053 B2 | 11/2019 | Wloczysiak |
| 10,560,139 B2 | 2/2020 | Brunel et al. |
| 10,581,466 B2 | 3/2020 | Pehlke |
| 10,587,291 B2 | 3/2020 | Pehlke et al. |
| 10,608,590 B2 | 3/2020 | Gorbachov et al. |
| 10,615,841 B2 | 4/2020 | Liu et al. |
| 10,623,337 B2 | 4/2020 | Wloczysiak et al. |
| 10,637,555 B2 | 4/2020 | Wloczysiak |
| 10,659,121 B2 | 5/2020 | Pehlke |
| 10,666,300 B2 | 5/2020 | Wloczysiak et al. |
| 10,707,905 B2 | 7/2020 | Wloczysiak |
| 10,784,903 B2 | 9/2020 | Wloczysiak et al. |
| 10,826,546 B2 | 11/2020 | Pehlivanoglu |
| 10,873,384 B2 | 12/2020 | Wloczysiak |
| 10,924,160 B2 | 2/2021 | Wloczysiak |
| 10,944,523 B2 | 3/2021 | Pehlke et al. |
| 10,965,021 B2 | 3/2021 | Wloczysiak |
| 11,018,726 B2 | 5/2021 | Pehlke et al. |
| 11,038,543 B2 | 6/2021 | Chang et al. |
| 11,095,575 B2 | 8/2021 | Wloczysiak et al. |
| 11,128,323 B2 | 9/2021 | Pehlke et al. |
| 11,190,223 B2 | 11/2021 | Wloczysiak et al. |
| 11,245,385 B2 | 2/2022 | Oshita |
| 11,245,432 B2 | 2/2022 | Farahvash et al. |
| 11,271,602 B2 | 3/2022 | Domino et al. |
| 11,405,059 B2 | 8/2022 | Pehlke |
| 11,716,100 B2 | 8/2023 | Pehlke |
| 11,799,502 B2 | 10/2023 | Pehlke |
| 2005/0277387 A1 | 12/2005 | Kojima et al. |
| 2008/0315396 A1 | 12/2008 | Kuhlman et al. |
| 2009/0180403 A1* | 7/2009 | Tudosoiu .......... H04B 1/406 370/278 |
| 2013/0225107 A1* | 8/2013 | Lane .......... H04B 1/0458 455/234.1 |
| 2013/0273861 A1 | 10/2013 | See |
| 2014/0038667 A1* | 2/2014 | Little .......... H04B 1/006 455/553.1 |
| 2014/0073371 A1 | 3/2014 | Mujtaba et al. |
| 2014/0105079 A1 | 4/2014 | Bengtsson et al. |
| 2014/0119245 A1 | 5/2014 | Desjardins |
| 2014/0307836 A1* | 10/2014 | Khlat .......... H04B 1/04 375/343 |
| 2014/0321339 A1 | 10/2014 | Pehlke |
| 2015/0036656 A1 | 2/2015 | McCarthy et al. |
| 2015/0133067 A1 | 5/2015 | Chang et al. |
| 2015/0295596 A1 | 10/2015 | Wloczysiak et al. |
| 2015/0295597 A1 | 10/2015 | Wloczysiak |
| 2015/0296515 A1 | 10/2015 | Pehlivanoglu |
| 2016/0006556 A1 | 1/2016 | Pehlke et al. |
| 2016/0062865 A1 | 3/2016 | Tule |
| 2016/0126987 A1 | 5/2016 | Wloczysiak |
| 2016/0126993 A1 | 5/2016 | Wloczysiak |
| 2016/0126994 A1 | 5/2016 | Domino et al. |
| 2016/0127014 A1 | 5/2016 | Wloczysiak |
| 2016/0127015 A1 | 5/2016 | Wloczysiak et al. |
| 2016/0127016 A1 | 5/2016 | Pehlke et al. |
| 2016/0127025 A1 | 5/2016 | Wloczysiak |
| 2016/0127026 A1 | 5/2016 | Wloczysiak et al. |
| 2016/0127029 A1 | 5/2016 | Wloczysiak |
| 2016/0322997 A1 | 11/2016 | Wloczysiak et al. |
| 2016/0365908 A1 | 12/2016 | Chang et al. |
| 2017/0026061 A1 | 1/2017 | Wloczysiak |
| 2017/0026090 A1 | 1/2017 | Wloczysiak |
| 2017/0047981 A1 | 2/2017 | Wloczysiak |
| 2017/0048028 A1 | 2/2017 | Pehlke et al. |
| 2017/0163215 A1 | 6/2017 | Gorbachov et al. |
| 2017/0195106 A1 | 7/2017 | Pehlke |
| 2017/0222665 A1 | 8/2017 | Chang et al. |
| 2017/0244538 A1 | 8/2017 | Chang et al. |
| 2017/0317648 A1 | 11/2017 | Gorbachov et al. |
| 2017/0317710 A1 | 11/2017 | Liu et al. |
| 2017/0324451 A1 | 11/2017 | Wloczysiak |
| 2017/0373730 A1 | 12/2017 | Pehlke et al. |
| 2018/0019768 A1 | 1/2018 | King et al. |
| 2018/0063031 A1 | 3/2018 | Wloczysiak et al. |
| 2018/0076834 A1 | 3/2018 | Wloczysiak et al. |
| 2018/0131500 A1 | 5/2018 | Pehlke |
| 2018/0241424 A1 | 8/2018 | Domino et al. |
| 2018/0294858 A1 | 10/2018 | Pehlke |
| 2018/0351594 A1 | 12/2018 | Wloczysiak et al. |
| 2018/0351628 A1 | 12/2018 | Wloczysiak |
| 2019/0007073 A1 | 1/2019 | King et al. |
| 2019/0081385 A1 | 3/2019 | Avser et al. |
| 2019/0097661 A1 | 3/2019 | Chang et al. |
| 2019/0123769 A1 | 4/2019 | Pehlke et al. |
| 2019/0123770 A1 | 4/2019 | Pehlke |
| 2019/0140677 A1 | 5/2019 | Pehlivanoglu |
| 2019/0149178 A1 | 5/2019 | King et al. |
| 2019/0173530 A1 | 6/2019 | Wloczysiak |
| 2019/0181906 A1 | 6/2019 | Liu et al. |
| 2019/0181907 A1* | 6/2019 | Pfann .......... H03H 9/542 |
| 2019/0229679 A1 | 7/2019 | Gorbachov et al. |
| 2019/0230051 A1 | 7/2019 | Wloczysiak et al. |
| 2019/0260399 A1 | 8/2019 | Wloczysiak |
| 2019/0268027 A1 | 8/2019 | Wloczysiak et al. |
| 2019/0273314 A1 | 9/2019 | Wloczysiak |
| 2019/0280758 A1 | 9/2019 | Wloczysiak |
| 2019/0305804 A1 | 10/2019 | Pehlke et al. |
| 2020/0106463 A1 | 4/2020 | Chang et al. |
| 2020/0106497 A1 | 4/2020 | Pehlke |
| 2020/0112329 A1 | 4/2020 | Domino et al. |
| 2020/0112348 A1 | 4/2020 | Pehlke et al. |
| 2020/0162114 A1 | 5/2020 | King et al. |
| 2020/0162209 A1 | 5/2020 | Pehlke et al. |
| 2020/0228167 A1 | 7/2020 | Wloczysiak |
| 2020/0244597 A1 | 7/2020 | Wloczysiak et al. |
| 2020/0259549 A1 | 8/2020 | Wloczysiak |
| 2020/0287583 A1 | 9/2020 | Farahvash et al. |
| 2020/0358460 A1 | 11/2020 | Wloczysiak et al. |
| 2020/0358516 A1 | 11/2020 | Wloczysiak |
| 2020/0366320 A1* | 11/2020 | An .......... H04B 1/0057 |
| 2021/0013908 A1 | 1/2021 | Wloczysiak |
| 2021/0036724 A1 | 2/2021 | Lam |
| 2021/0058124 A1 | 2/2021 | Pehlke |
| 2021/0098897 A1 | 4/2021 | Pehlke et al. |
| 2021/0099199 A1 | 4/2021 | Pehlke et al. |
| 2021/0135690 A1 | 5/2021 | Pehlke |
| 2021/0143789 A1 | 5/2021 | Azizi |
| 2021/0143795 A1 | 5/2021 | Azizi |
| 2021/0143852 A1 | 5/2021 | Pehlke |
| 2021/0175916 A1 | 6/2021 | Pehlivanoglu |
| 2021/0184346 A1 | 6/2021 | Wloczysiak |
| 2021/0211145 A1 | 7/2021 | Loh et al. |
| 2021/0273670 A1* | 9/2021 | Yasuda .......... H04B 1/1615 |
| 2021/0313947 A1 | 10/2021 | Shen et al. |
| 2021/0314007 A1 | 10/2021 | Shen et al. |
| 2021/0314014 A1 | 10/2021 | Shen et al. |
| 2021/0314015 A1 | 10/2021 | Shen et al. |
| 2021/0314016 A1 | 10/2021 | Shen et al. |

(56) References Cited

U.S. PATENT DOCUMENTS

2021/0384925 A1* 12/2021 Nagamori ............... H04B 1/38
2022/0038392 A1   2/2022 Wloczysiak et al.
2022/0045710 A1   2/2022 Farahvash et al.
2022/0069846 A1   3/2022 Loh et al.
2022/0069850 A1   3/2022 Loh et al.
2023/0336193 A1  10/2023 Pehlke

* cited by examiner

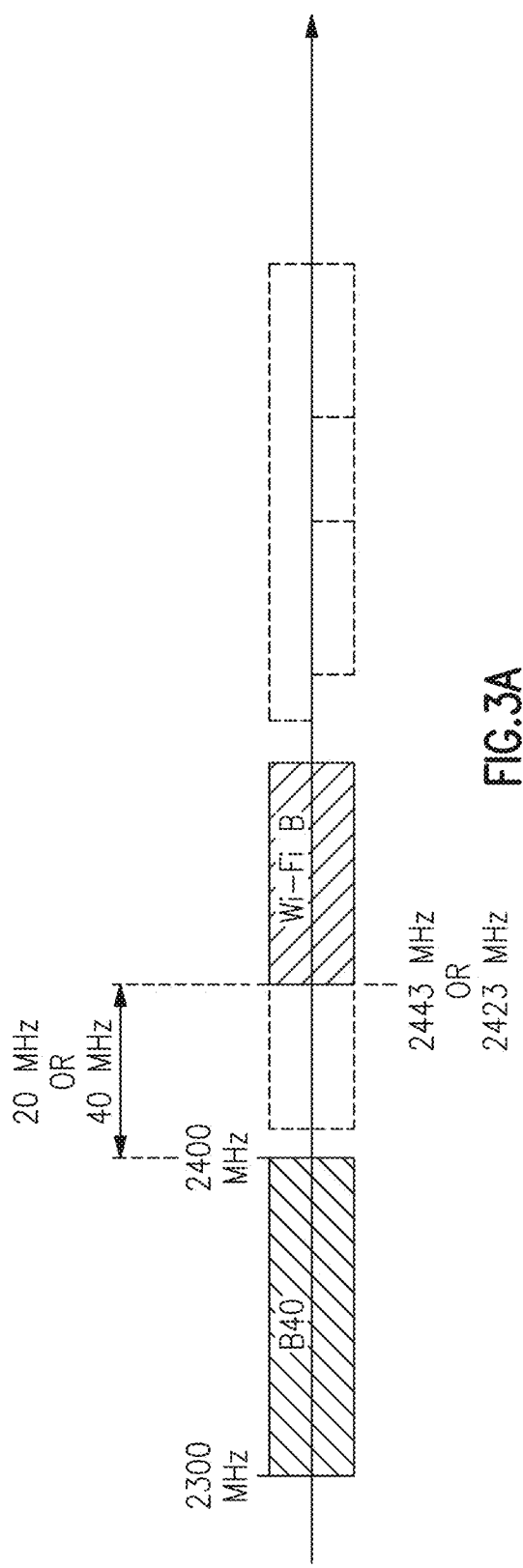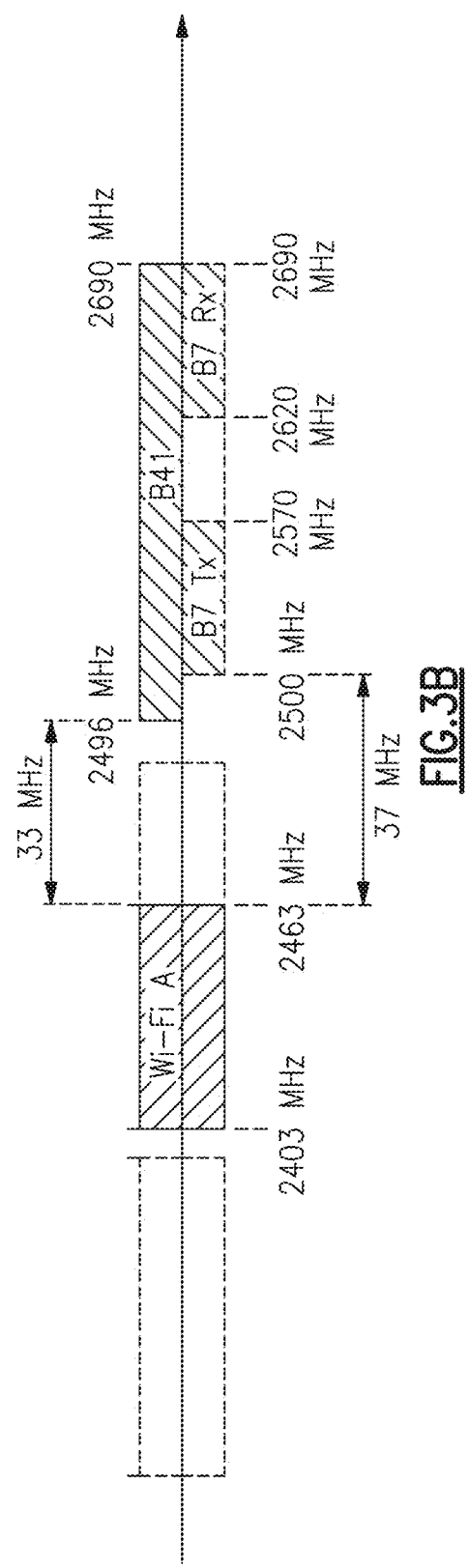
FIG.3A
FIG.3B

CONVERGED RADIO FREQUENCY FRONT-END ARCHITECTURE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority of U.S. Provisional Patent Application 62/958,849, filed Jan. 9, 2020, titled "Converged Radio Frequency Front-End Architecture," the disclosure of which is hereby incorporated by reference in its entirety herein.

BACKGROUND

Field of the Invention

The present invention is generally in the field of wireless communication devices, and more particularly, to front end modules for multiple frequency bands.

Description of the Related Art

A front-end module of wireless communication devices is typically configured to filter received radio-frequency (RF) signals. The RF signals can be cellular signals, wireless local area signals (WLAN), e.g., Wi-Fi signals, or the like. Since multiple frequency bands can exist close to each other, the front-end module can be configured to separate frequencies bands adjacent to each other.

SUMMARY

The innovations described in the claims each have several aspects, no single one of which is solely responsible for its desirable attributes. Without limiting the scope of the claims, some prominent features of this disclosure will now be briefly described.

One aspect of this disclosure is a switching circuit for switching radio frequency signals. The switching circuit comprises a first filter configured to filter first radio frequency signals in a first frequency band that is adjacent to a second frequency band. The second frequency band includes a first region and a second region, where the second region is further than the first region from the first frequency band. The switching circuit further comprises a second filter configured to filter second radio frequency signals in the second region of the second frequency band and a plurality of switches configured to concurrently route received radio frequency signals from an antenna through the first and second filters.

The received radio frequency signals can be one or more of TDD signals and FDD signals. The first region and the second region can partially overlap. A frequency range of the partial overlap can be approximately 20 MHz. The frequency range of the partial overlap can be approximately 40 MHz.

The switching circuit can further comprise a third filter configured to filter a third radio frequency signals in a third frequency band that is adjacent to the second region of the second frequency band and a fourth filter configured to filter fourth radio frequency signals in the first region of the second frequency band, where the plurality of switches is further configured to concurrently route the received radio frequency signals from the antenna through the third and fourth filters.

The first filter, the second filter, the third filter, and the fourth filter can include at least one surface acoustic wave filter or at least one a bulk acoustic wave filter. The switching circuit can further comprise a control circuit configured to control the plurality of switches to route the received radio frequency signals from the antenna through the first and second filters or to route the received radio frequency signals from the antenna through the third and fourth filters. The first and the third frequency bands can be cellular frequency bands and the second frequency band can be a Wi-Fi frequency band.

Another aspect of this disclosure is a method of operating a switching circuit. The method comprises routing signals from an antenna to receiver circuitry through a first filter, where the first filter is configured to filter a first cellular frequency band that is adjacent to a second frequency band that includes a first region and a second region, and the second region is further than the first region from the first frequency band. The method further comprises concurrently routing the signals from the antenna to the receiver circuitry through a second filter, the second filter being configured to filter the second region.

The method can further comprise routing the signals from the antenna to the receiver circuitry through a third filter configured to filter a third frequency band that is adjacent to the second region of the second frequency band, concurrently routing the signals from the antenna to the receiver circuitry through a fourth filter configured to filter the first region of the second frequency band, and receiving a control signal to control the routing of the signals from the antenna through the first and second filters or the routing of the signals from the antenna through the third and fourth filters.

The signals can be one or more of TDD signals and FDD signals. The first region and the second region can partially overlap. The first and the third frequency bands can be cellular frequency bands and the second frequency band can be a Wi-Fi frequency band. The first filter, the second filter, the third filter, and the fourth filter can include at least one surface acoustic wave filter or at least one bulk acoustic wave filter.

Another aspect of this disclosure is a wireless device comprising an antenna configured to receive and transmit radio frequency signals; a switching circuit including a first filter configured to filter a first frequency band that is adjacent to a second frequency band, the second frequency band having a first region and a second region that is further than the first region from the first frequency band, and a second filter configured to filter the second region of the second frequency band; and a plurality of switches configured to concurrently route the radio frequency signals from the antenna through the first and second filters.

The radio frequency signals can be one or more of TDD signals and FDD signals. The first region and the second region can partially overlap. The first and the third frequency bands can be cellular frequency bands and the second frequency band can be a Wi-Fi frequency band. The wireless device can further comprise a third filter configured to filter a third frequency band that is adjacent to the second region of the second frequency band; and a fourth filter configured to filter the first region of the second frequency band, wherein the plurality of switches is further configured to concurrently route the radio frequency signals from the antenna through the third and fourth filters.

The wireless device can further comprise a control circuit configured to control the plurality of switches to route the signals from the antenna through the first and second filters or to route the signals from the antenna through the third and fourth filters. The first filter, the second filter, the third filter, and the fourth filter can include at least one surface acoustic wave filter or at least one bulk acoustic wave filter. The switching circuit can be implemented on a semiconductor die.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIG. 3A illustrates an example of a frequency band configuration utilized in wireless communications.

FIG. 3B illustrates an example of a frequency band configuration utilized in wireless communications.

DETAILED DESCRIPTION

Figure 1:
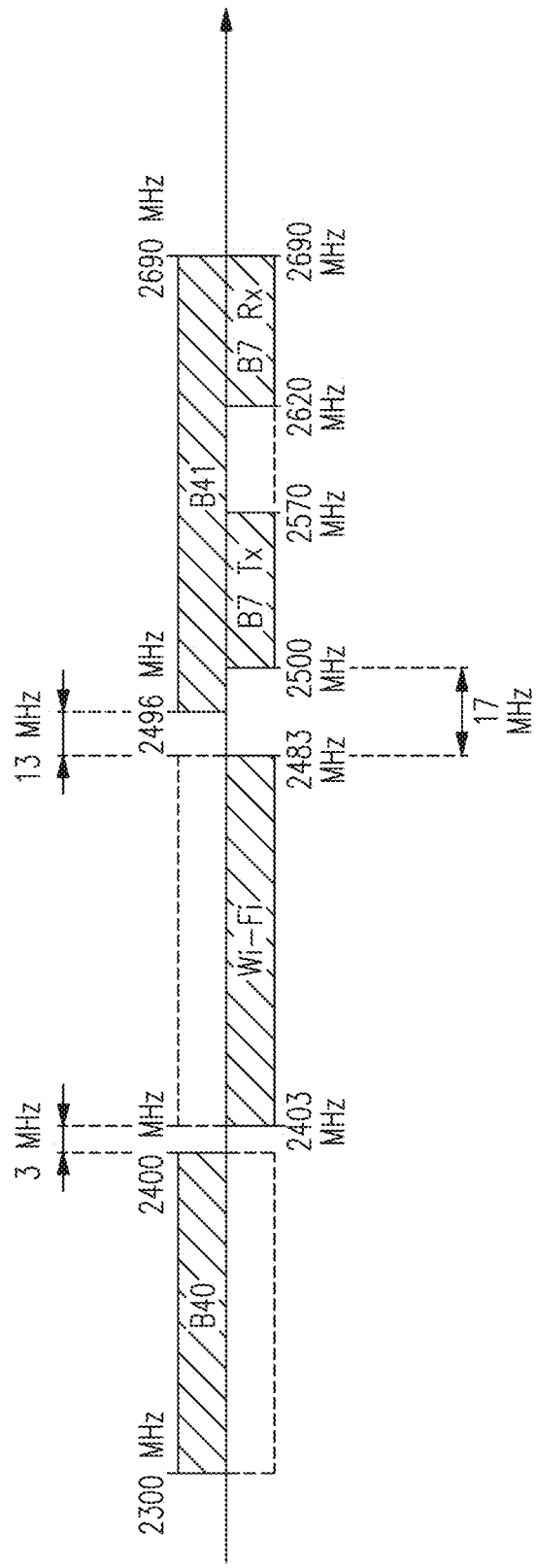
FIG. 1 illustrates an example of frequency bands that can be utilized in wireless communications.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

FIG. 1 illustrates an example of radio frequency (RF) bands that can be utilized in wireless communications. Band 41 (B41) is used in time division duplex (TDD) communications and thus has a single frequency band of 2496 MHz to 2690 MHz, which is utilized for both transmitted (Tx) and received (Rx) operations. Similarly, Band 40 (B40) is used in TDD communications and thus has a single frequency band of 2300 MHz to 2400 MHz. Band 7 (B7) is used in frequency division duplex (FDD) communications and thus performs simultaneous Tx and Rx operations via different frequencies, for example, Tx (2500 MHz to 2570 MHz) and Rx (2620 MHz to 2690 MHz) paths. This is typically accomplished by the use of a duplexer, which combines the Tx and Rx paths into a common terminal. B41, B7 and B40 can be utilized in cellular communications, e.g., 3rd generation partnership project (3GPP) wireless device. The 2.4 GHz Wi-Fi band has a frequency range of 2403 MHz to 2483 (or 2483.5) MHz, which lies between the B40 and B41 (or B7) and can be utilized in wireless local area signal (WLAN). As illustrated in FIG. 1, a gap between a lower channel of Wi-Fi and an upper channel of B40 is 3 MHz. A gap between an upper channel of Wi-Fi and a lower channel of B41 is 13 MHz. A gap between an upper channel of Wi-Fi and a lower channel of B7 is 17 MHz. These small gaps between two adjacent bands typically result in high insertion loss and frequency roll-off at the edges of adjacent bands.

Cellular RF front-ends that connect the cellular radio frequency integrated circuit (RFIC) transceiver to the antenna system, and Wi-Fi RF front-ends that do the same with a (typically) separate RFIC transceiver (XCVR) and baseband (BB) from the cellular hardware solution to connect to the antenna system—are historically separate because of 1) separate radio BB and XCVR naturally kept interfacing, placement, and controls distinct from one another, and 2) coexistence efforts concerning the concurrent radio access technologies (RATs) tried to separate the RF from coupling or interacting with one another. The frequencies for 2.4 GHz are adjacent and interspersed with the cellular high bands (HBs) B40, B41, B7 as shown in FIG. 1. Historically, Wi-Fi and cellular were kept on separate antennas which led to remote geographical placements and less common connectivity to shared antenna feeds. With the advent of more and more downlink (DL) and uplink (UL) carrier aggregation (CA) within LTE, and the addition of 5G and associated CA, E-UTRA-NR dual connectivity (EN-DC) and concurrent transmit, receive, and all combinations therein—as well as the addition of mm Wave 5G active antenna array panels (multiple placements), the available space for RF hardware, as well as available volume for the antenna solution is challenged. To support the separate RATs across LTE, sub-7 GHz NR, mm Wave NR, and 2.4 GHz+5 GHz Wi-Fi, and now the addition of the UNII-5, 6, 7, 8 bands for NR-U is to consolidate the antenna system into fewer, shared antennas. However, the architecture solutions do not yet exist to optimally support such consolidation.

Previous solutions for the coexistence of Wi-Fi and cellular bands for mobile devices has focused on designing and delivering ever more advanced filters that reject channels of the other RAT very close to band edge. For example, BAW and FBAR filter technologies with steeper skirts and the ability to attenuate close to band edge with lower in-band insertion loss have been used. However, this produces more in-band insertion loss and still suffers degraded performance due to Tx leakage and receive band noise of channels in different RATs at small offset frequencies from one another. Other solutions based on software simply "blank" one or the other RAT and suffer the large degradation in link quality, throughput, and spectral efficiency/capacity, etc.

Figure 2:
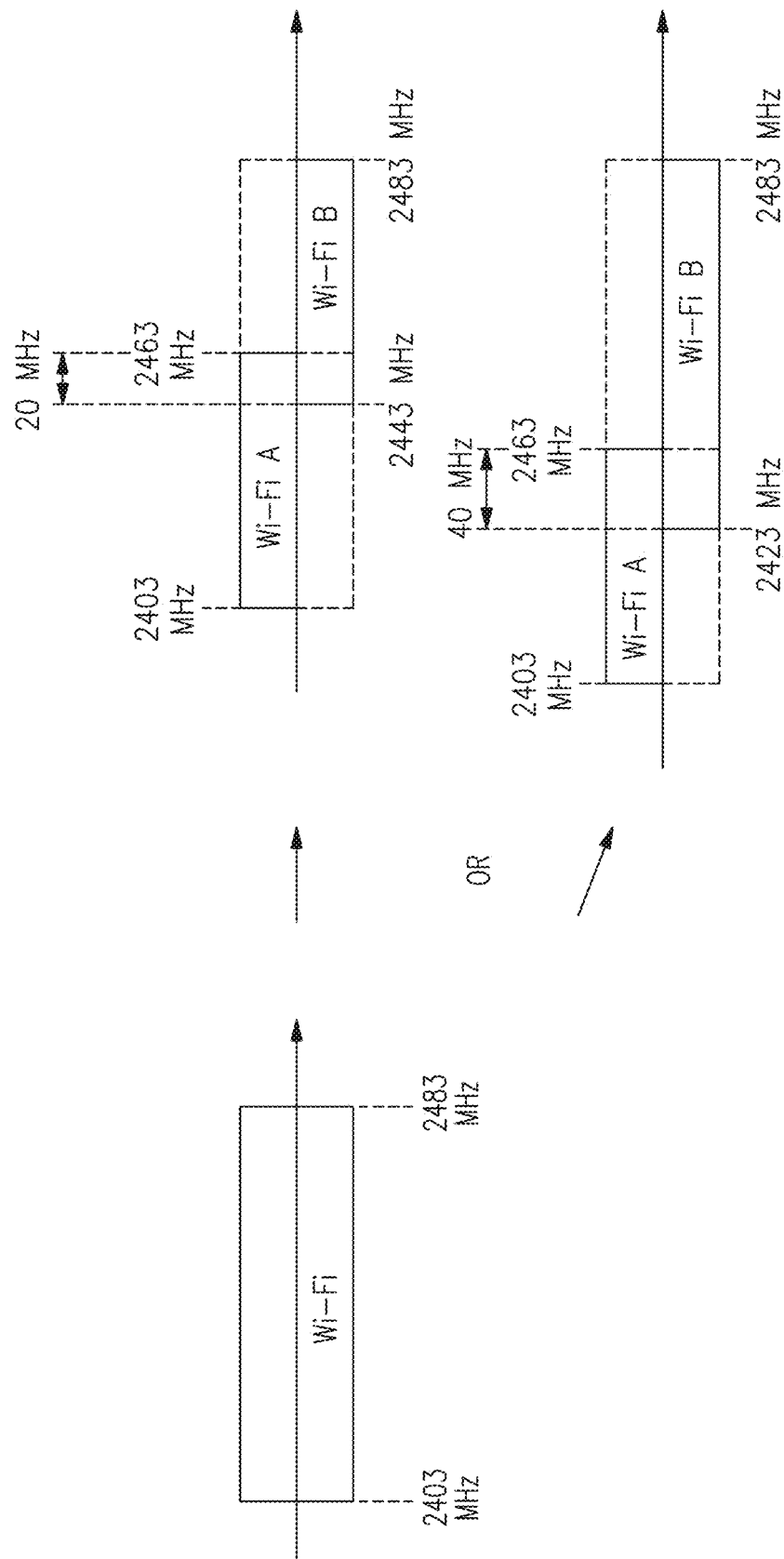
FIG. 2 illustrates an example of a frequency band divided into two regions partially overlapping each other.

FIG. 2 illustrates an example of a frequency band divided into two regions partially overlapping each other. In the illustrated embodiment, Wi-Fi band of 2403 MHz to 2483 MHz can be divided into two overlapping regions, Wi-Fi A and Wi-Fi B. In one aspect, the overlapping region can support at least a 20 MHz bandwidth channel. For example, Wi-Fi A can have a range of approximately 2403 MHz to 2463 MHz and Wi-Fi B can have a range of approximately 2443 MHz to 2483 MHz. In another aspect, the overlapping region can support at least a 40 MHz bandwidth channel. For example, Wi-Fi A can have a range of approximately 2403 MHz to 2463 MHz and Wi-Fi B can have a range of approximately 2423 MHz to 2483 MHz. The ranges of Wi-Fi A, Wi-Fi B and the overlapping region can vary based on the Wi-Fi standard or required channel bandwidth.

FIG. 3A illustrates an example of a frequency band configuration of B40 and Wi-Fi B band without Wi-Fi A, B7 and B41. In this configuration, a gap between B40 and Wi-Fi B is approximately 20 MHz (when Wi-Fi B is selected as approximately 2423 MHz to 2483 MHz) or approximately 40 MHz (when Wi-Fi B is selected as approximately 2443 MHz to 2483 MHz). The gap between B40 and Wi-Fi B can vary depending on the division of the Wi-Fi band. This band configuration can provide a larger gap than 3 MHz in frequency offset, better out of band attenuation and lower in-band insertion loss.

FIG. 3B illustrates an example of a frequency band configuration of B41 and/or B7 Tx and Wi-Fi A band without B40 and Wi-Fi B. In this configuration, a gap between B41 and Wi-Fi A is approximately 33 MHz and a gap between B7 Tx and Wi-Fi A is approximately 37 MHz. These band configurations can provide a larger gap in frequency offset, better out of band attenuation and lower in-band insertion loss.

As illustrated above, the 2.4 GHz Wi-Fi band (2403 MHz-2483 MHz with approximately 3 MHz gap separating its lower channels with the upper channels of B40, and approximately 13 MHz separating its upper channels from the lower channels of B41) can be split into 2 overlapping regions of frequency and 2 separate filter RF paths. The overlap is variable and dependent on the implementation, but can support at least 20 MHz channel placements, and potentially 40 MHz channels as illustrated in FIG. 1. This depends on the Wi-Fi a/b/g/n/x standard that is supported by the implementation. Advantageously, splitting the Wi-Fi band into 2 filters ("A" with excellent performance for the lower Wi-Fi 2.4 GHz channels, and "B" with excellent performance for the upper Wi-Fi 2.4 GHz channels) provides that each filter is narrower in bandwidth and can provide better out-of-band (OOB) attenuation and lower in-band insertion loss (IL), and also provides a larger gap in frequency offset between its band edges and the cellular bands.

Advantageously, Wi-Fi "A" lower channel filter can be successfully "switch-combined" through multi-on engagement of simultaneous switch arms on the antenna switching module (ASM) to be programmatically "ganged" with either B41 or B7 with extremely low loading loss and excellent Rx performance in all paths. Similarly the Wi-Fi "B" upper channel filter path can be switch-combined with B40 with excellent performance. In this way, a high performance filter solution can support both cellular and Wi-Fi on a shared antenna feed with little to no Rx DeSense or degradation. For embodiments where the upper Wi-Fi channels (Wi-Fi filter "B") is engaged with B41 or B7, the front end architecture can 1) switch-combine and use the narrower improved Wi-Fi filter performance to improve OOB, 2) operate Wi-Fi on one antenna and cellular on another antenna and not support 4×4 DL MIMO in the cellular HB in order to leverage the antenna isolation for the more difficult combination, or 3) fall back to software "blanking."

Aspects of this disclosure relate to the architecture and methods of use for integrated filters inside the front end module connected to the common ASM. Selection of Wi-Fi filter "A" or filter "B" uses knowledge of the channel from the BB of the Wi-Fi, and can coordinate with the cellular BB. The combination of paths can be selected based at least in part on the specific channels of each RAT. Embodiments may utilize BB coordination or concurrent decoding of separate control logic for the module. Embodiments disclosed herein provide switching module architectures that provide improved front end module performance, size, and reduced antenna count.

To utilize the frequency configurations described above, the front-end module of a wireless communication device, such as a cell phone and the like, comprises a switching module and signal conditioning/filtering circuits to direct the RF transmit signal from the power amplifier through the selected transmit circuitry to an antenna for transmission. The switching and filtering circuit further directs the RF receive signal received by the antenna through the selected receive circuitry for baseband processing.

Figure 4A:
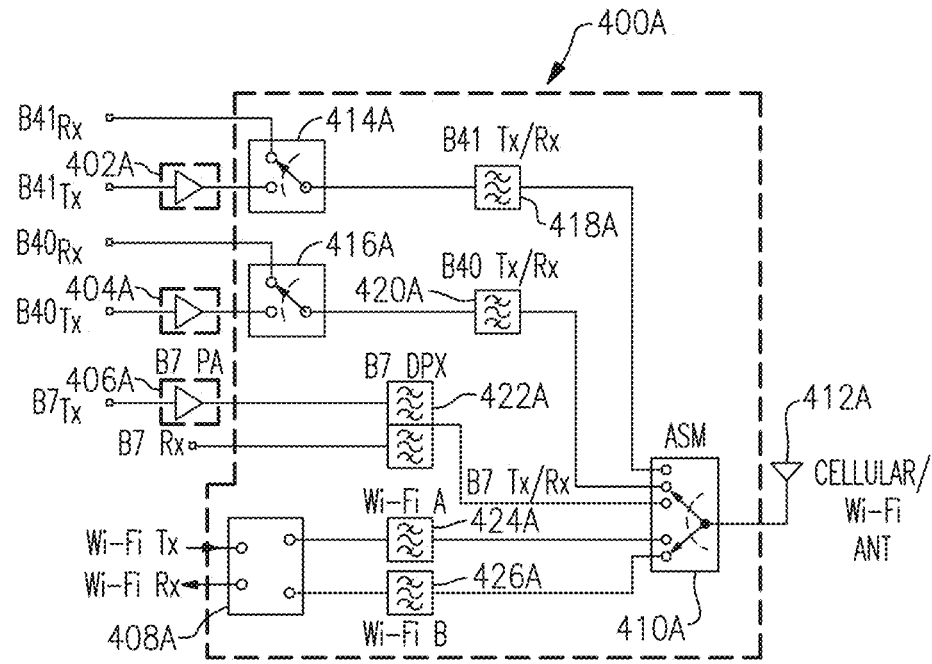
FIG. 4A is a schematic diagram of an embodiment of a switching circuit configured to route a signal through certain combination of switches.

FIG. 4A is a schematic diagram of an embodiment of a switching circuit 400A configured to route signals through certain combination of switches. In the illustrated embodiment, the switching circuit 400A comprises a Wi-Fi switch 408A, Tx/Rx select switches 414A, 416A, an antenna switch 410A, such as, but not limited to an antenna switching module (ASM), a duplex filter 422A and a plurality of transmit/receive filters 418A, 420A, 424A, 426A. The switching circuit 400A transmits an RF transmit signal to an antenna 412A and receives an RF receive signal, from the antenna 412A and routes the RF receive signal through the appropriate filter to receiver circuitry for subsequent downconversion and baseband processing. The RF receive signal may be received as an FDD signal or a TDD signal, and have specific frequency band configuration.

Referring to FIG. 4A, a RF transmit signal $B41_{Tx}$, $B40_{Tx}$ and $B7_{Tx}$ can be sent from transmitter circuitry to a power amplifier 402A, 404A and 406A, respectively. The power amplifier 402A, 404A and 406A receives the RF transmit signal $B41_{Tx}$, $B40_{Tx}$ and $B7_{Tx}$ and amplifies the signal for transmission, respectively.

In an embodiment, B7 utilizes a duplexer filter 422A configured to filter transmit and receive FDD RF signals in radio devices, where the transmission and the reception are made at different frequencies via the same antenna. Typically, a duplex filter is a three-port circuit element comprising transmitter port, a receiver port, and an antenna port. An RF signal supplied to the transmitter port at the transmit frequency sees the signal path towards the receiver port as a high impedance, so that the radio power is not substantially directed to the receiver port, but it is directed through the antenna port to the antenna, where it is radiated as a RF signal to the environment. Correspondingly, an RF signal received through the antenna and the antenna port at the receive frequency sees the transmitter port as a high impedance, so that it is directed to the receiver port and further to the receiver sections of the radio device. The function of the duplex filter is generally based on different frequency response characteristics of the filter components. The duplex filter 422A can comprise a transmit filter and a receive filter. The duplex filter 422A can further comprise bandpass filter(s). Further combinations of these TX and RX bands can be logically extended to gang multiple TX and RX filters together toward a single antenna port as well.

In the illustrated embodiment, B41 utilizes a filter 418A for transmitting RF signal to and receiving RF signal from the antenna 412A. A switch 414A can be configured to provide some or all of the TDD functionality. For example, when transmitting an RF signal to the antenna 412A, the switch 414A connects the power amplifier 402A with the filter 418A. When receiving RF signal from the antenna 412A, the switch 414A connects the filter 418A to $B41_{Rx}$. The switch 414A can be controlled by at least one signal from a baseband subsystem that includes a processor and/or is based at least in part on the frequency band configuration. In an embodiment, the filter 418A comprises one or more band pass filter(s).

Similarly, in the illustrated embodiment, B40 utilizes a filter 420A for transmitting RF signal to and receiving RF signal from the antenna 412A. A switch 416A can be configured to provide some or all of the TDD functionality. For example, when transmitting RF signal to the antenna 412A, the switch 416A connects the power amplifier 404A with the filter 420A. When receiving RF signal from the antenna 412A, the switch 416A connects the filter 420A to $B40_{Rx}$. The switch 416A can be controlled by at least one signal from a baseband subsystem that includes a processor and/or is based at least in part on the frequency band configuration. In an embodiment, the filter 420A comprises one or more band pass filter(s).

Wi-Fi band of 2403 MHz to 2483 MHz can utilize a Wi-Fi A filter 424A and/or a Wi-Fi B 426B filter depending on the frequency region. The filter 424A can comprise one or more band pass filter(s). A switch 408A can be configured to select at least one of a Wi-Fi A filter 424A or a Wi-Fi B filter 426A depending on the frequency region. The switch 408A can be controlled by at least one signal from a baseband subsystem that includes a processor and/or is based at least in part on the frequency band configuration.

Each of the filters 418A, 420A, 422A, 424A, and 426A can comprise a surface acoustic wave (SAW) filter and/or a bulk acoustic wave (BAW) filter. SAW and/or BAW devices utilize the piezoelectric effect to convert energy back and forth between the electrical and mechanical realms where the presence of an electrical field causes the material to deform and the application of a mechanical stress induces an electric charge.

The antenna switch 410A can be configured to support transmitting RF signals. In the embodiment illustrated in FIG. 4A, the antenna switch 410A routes the transmit signal from the selected filters 418A, 420A, 422A, 424A, 426A to the antenna 412A for transmission. The antenna switch 410A can be configured to select at least one filter among the filters 418A, 420A, 422A and one filter of the Wi-Fi filters 424A, 426A. In the embodiment illustrated in FIG. 4A, the antenna switch 410A comprises a single pole double throw switch and a single pole triple throw switch. One terminal of the single pole double throw switch and one terminal of the single pole triple throw switch can electrically connect to the antenna 412A. The single pole double throw switch electrically connects to the Wi-Fi A filter 424A or the Wi-Fi B filter 426A. The single pole triple throw switch connects to at least one of the filters 418A, 420A, and 422A. The position of the antenna switch 410A is controlled by at least one signal from the baseband subsystem that includes the processor and/or is based at least in part on the frequency band configuration. In another embodiment, the antenna switch 410A can comprise a configuration forming more than two connections between the antenna 412A and the filters 418A, 420A, 422A, 424A, 426A. Further, the antenna switch 410A can be configured to select three or more filters among the filters 418A, 420A, 422A and the Wi-Fi filters 424A, 426A. In an embodiment, the antenna switch 410A is configured to select both the Wi-Fi filters 424A and 426A.

As described above, the antenna switch 410A can be also configured to receive RF signals. When the switching circuit 400A is configured to receive, the antenna 412A receives the RF receive signal. The antenna switch 410A routes the RF receive signal to the appropriate filter. For example, when the RF receive signal comprises B41 signal, the antenna switch 410A routes the RF receive signal at least to the filter 418A for filtering. When a device including the switching circuit 400A communicates with a base station with B40, the antenna 412A can receive the RF receive signal including B40 and the antenna switch 410A can route the RF receive signal at least to the filter 420A for filtering. Similarly, when a device including the switching circuit 400A communicates with a base station with B7, the antenna 412A can receive an RF receive signal including B7 and the antenna switch 410A can route the RF receive signal at least to the filter 422A for filtering. When the RF receive signal comprises Wi-Fi signal, the antenna switch 410A can route the receive signal to at least one of the Wi-Fi filters 424A, 426A for filtering. When the device including the switching circuit 400A communicates with another device with the Wi-Fi signal, the antenna switch 410A can route the Wi-Fi signal to at least one of the Wi-Fi filters 424A, 426A for filtering.

In an embodiment, the antenna switch 410A can be configured to select at least one filter of the filters 418A, 420A, 422A and one filter of the Wi-Fi filters 424A, 426A. The antenna switch 410A can be configured to select at least one filter of the filters 418A (for B41) and 422A (for B7) together with the Wi-Fi A filter 424A. According to the frequency band configuration illustrated in FIG. 3B, the gap between B41 (or B7) and Wi-Fi A band is larger than that between B41 (or B7) and Wi-Fi band before the division. Similarly, the antenna switch 410A can configured to select the filter 420A (for B40) together with the Wi-Fi B filter 426A. According to the frequency band configuration illustrated in FIG. 3A, the gap between B40 and Wi-Fi B band is larger than that between B40 and Wi-Fi band before the division.

Again, the at least one signal from the baseband subsystem controls the selection of the filters 418A, 420A, 422A and the Wi-Fi filters 424A, 426A and the selection is based at least in part on the frequency band configuration.

Figure 4B:
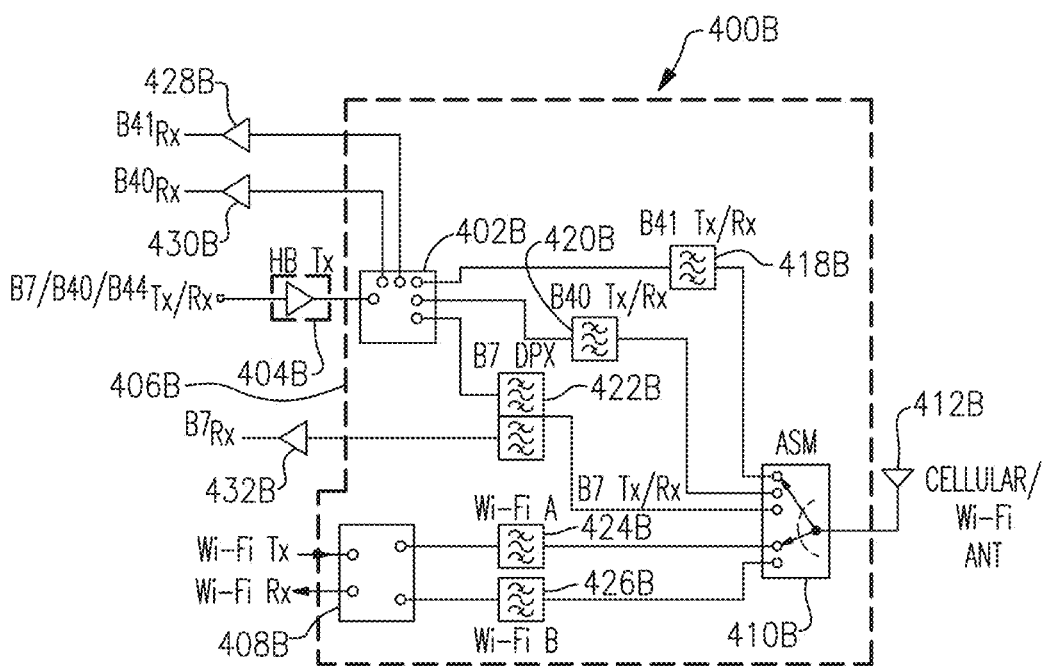
FIG. 4B is a schematic diagram of an embodiment of a switching circuit configured to route a signal through certain combination of switches.

FIG. 4B is a schematic diagram of an embodiment of a switching circuit 400B configured to route signals through certain combination of switches. In the illustrated embodiment, the switching circuit 400B comprises a Wi-Fi switch 408B, a TX/RX select switch 402B, an antenna switch 410B, a duplex filters 422B and a plurality of transmit/receive filters 418B, 420B, 424B, 426B. The switching circuit 400B can receive an RF receive signal from an antenna 412B and can route the RF receive signal through the appropriate filter to receiver circuitry for subsequent down conversion and baseband processing. The RF receive signal may be received as an FDD signal or a TDD signal, and/or have specific frequency band configuration.

An RF transmit signal $B41_{Tx}$, $B40_{Tx}$ and $B7_{Tx}$ can be sent from transmitter circuitry to a common power amplifier 404B. The TX/RX select switch 402B can be configured to select one of filters 418B, 420B, and 422B. The FDD operation of the B7, TDD operations of the B40 and B41 bands, the filters 418B, 420B, 422B, 424B, 426B and an antenna switch 410B can be performed similarly to those described in reference to FIG. 3A. The TX/RX select switch 402B can be controlled by at least one signal from a baseband subsystem that includes a processor and/or is based at least in part on the frequency band configuration. The TX/RX select switch 402B can be further configured to select one of low noise amplifier circuitry 428B, 430B when an RF receive signal comes from the filters 418B, 420B. Low noise amplifier circuitry 432B can be connected to an output of the filter 422B.

Splitting the 2.4 GHz Wi-Fi band into two frequency regions, e.g., Wi-Fi A and Wi-Fi B, and using one of the frequency regions with an adjacent frequency band is one example of coexisting frequency bands. Other frequency bands can be split into upper and lower frequency regions and used concurrently with an adjacent frequency band. When a third frequency band is located between two frequency bands, e.g., a first frequency band and a second frequency band, the third frequency band can be split into two frequency regions, e.g., a first frequency region being located further from the second frequency band and a second frequency region being located further from the first frequency band. The first frequency region and the second frequency band can be used together. The second frequency region and the first frequency band can be used together. Filters are configured to be selected based on the frequency region and band selection. Signals in the frequency bands can be at least one of TDD and FDD. For example, Signals in all bands are TDD, signals in all bands are FDD or signals in some bands are TDD and signals in some bands are FDD.

Further, not only when the third frequency band is located between two frequency bands but also when there are two adjacent bands, a similar method and configuration can be used. For example, when a first frequency band is adjacent to a second band, the first frequency band can be divided into two frequency regions, such as first region and a second region. When the second frequency band is used, the frequency region of the first frequency band which is located further from the second frequency band can be selected and used together with the second frequency band. Filters are configured to be selected based on the frequency region and band selection. Here, signals in the frequency bands can be at least one of TDD and FDD. For example, signals in all bands are TDD, signals in all bands are FDD or signals in some bands are TDD and signals in some bands are FDD.

Figure 5A:
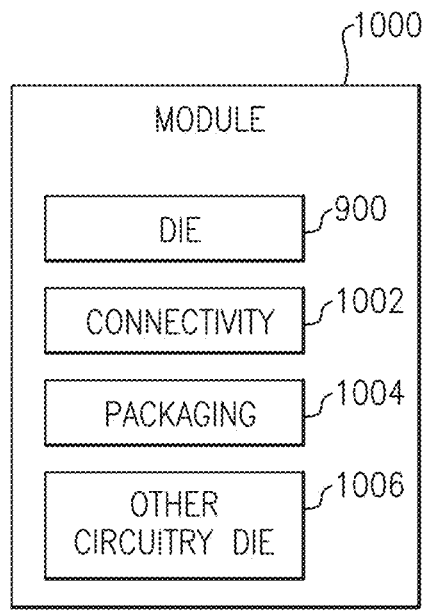
FIG. 5A is an exemplary block diagram of switching module including the multimode semiconductor die, according to certain embodiments.

FIG. 5A is an exemplary block diagram of switching module 1000. In the illustrated embodiment, a multimode semiconductor die 900 can include the switching and signal filtering circuit 400A or 400B that includes a filtering circuit, e.g., the filters 418A, 418B, 420A, 420B, 422A, 422B, 424A, 424B, 426A, 426B, and a switching circuit, e.g., 414A, 416A, 402B, 408A, 408B, 410A, 410B.

Figure 5B:
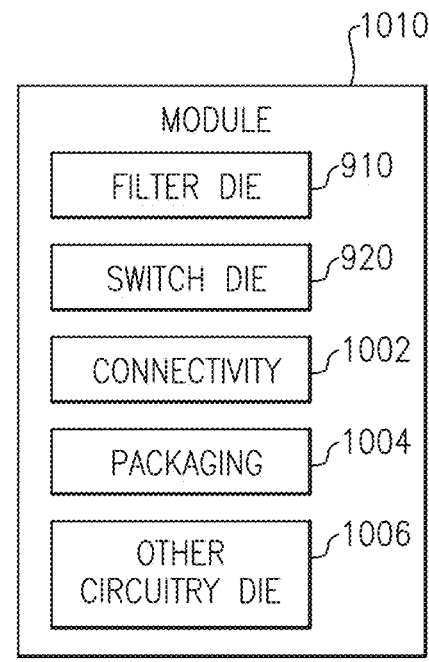
FIG. 5B is an exemplary block diagram of a switching module including the filter and switch semiconductor die, according to certain embodiments.

FIG. 5B is an exemplary block diagram of a multi-chip switching module 1010. In an embodiment, a filter die 910 can include a filtering circuit, e.g., 418A, 418B, 420A, 420B, 422A, 422B, 424A, 424B, 426A, 426B. A switch die 920 can include a switching circuit, e.g., 414A, 416A, 402B, 408A, 408B, 410A, 410B.

Figure 5C:
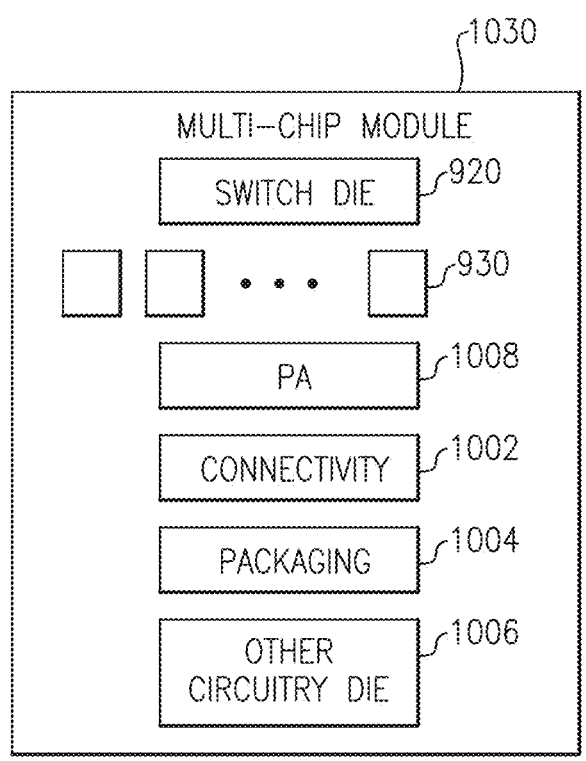
FIG. 5C is an exemplary block diagram of a multi-chip module, the filter and switch semiconductor die, according to certain embodiments.

FIG. 5C is an exemplary block diagram of a multi-chip switching module 1030 including the switch die 920 and a plurality of SAW or BAW filters 930 The multi-chip module 1030 can further include power amplifier (PA) circuitry 1008.

The modules 1000, 1010, 1030 can further include connectivity 1002 to provide signal interconnections, packaging 1004, such as for example, a package substrate, for packaging of the circuitry, and other circuitry die 1006, such as, for example amplifiers, pre-filters, post filters modulators, demodulators, down converters, and the like, as would be known to one of skill in the art of semiconductor and multi-chip module fabrication in view of the disclosure herein.

Figure 6:
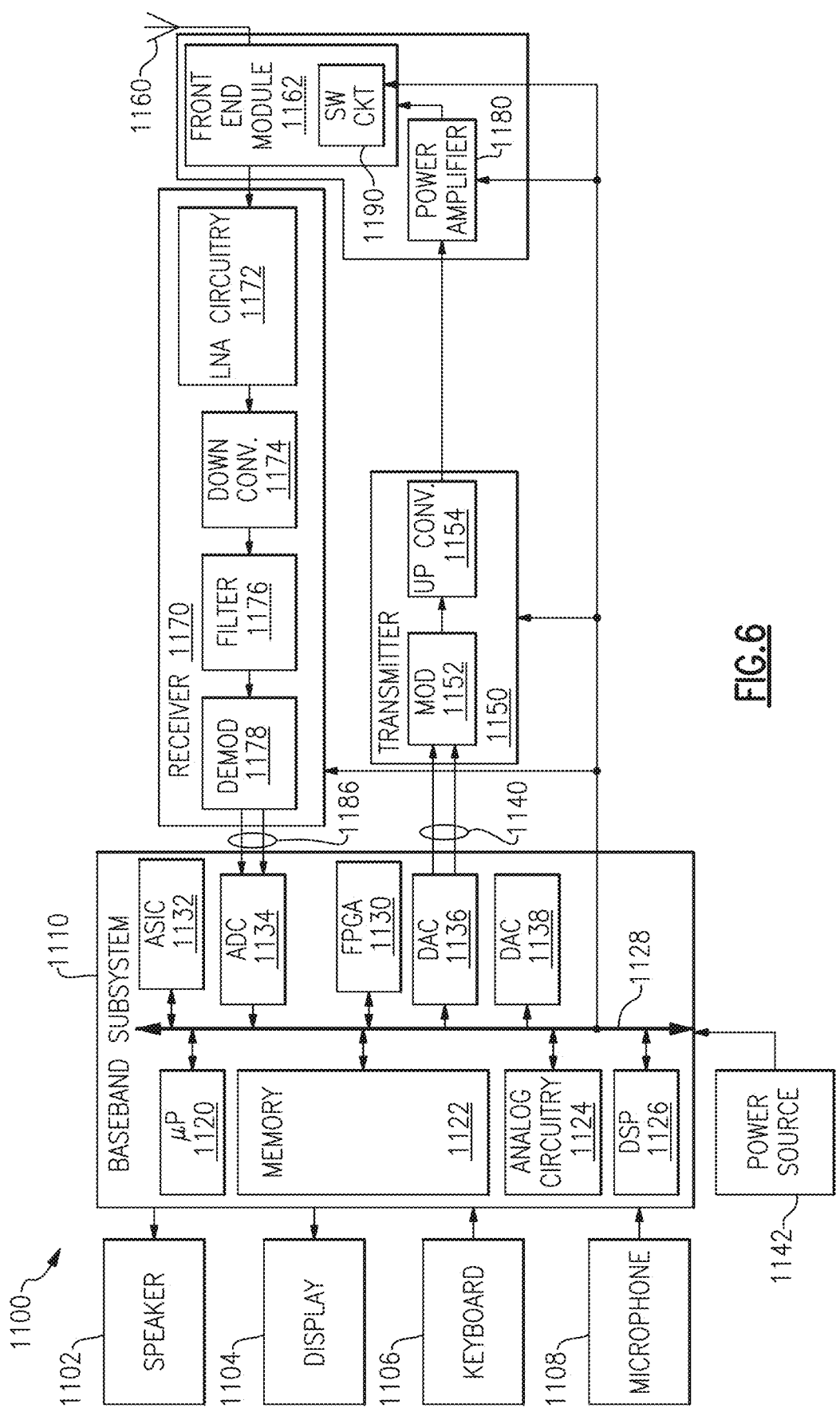
FIG. 6 is an exemplary block diagram illustrating a simplified wireless device including an embodiment of a switching circuit.

FIG. 6 is an exemplary block diagram illustrating a simplified wireless device 1100 including an embodiment of the switching and signal conditioning/filtering circuit 400A, 400B configured to switch and condition/filter the RF transmit signal and the RF receive signal in order to implement selected frequency band configuration.

The wireless device 1100 includes a speaker 1102, a display 1104, a keyboard 1106, and a microphone 1108, all connected to a baseband subsystem 1110. A power source 1142, which may be a direct current (DC) battery or other power source, is also connected to the baseband subsystem 1110 to provide power to the wireless device 1100. In a particular embodiment, the wireless device 1100 can be, for example but not limited to, a portable telecommunication device such as a mobile cellular-type telephone. The speaker 1102 and the display 1104 receive signals from baseband subsystem 1110, as known to those skilled in the art. Similarly, the keyboard 1106 and the microphone 1108 supply signals to the baseband subsystem 1110. The baseband subsystem 1110 includes a microprocessor (µP) 1120, memory 1122, analog circuitry 1124, and a digital signal processor (DSP) 1126 in communication via bus 1128. Bus 1128, although shown as a single bus, may be implemented using multiple busses connected as necessary among the subsystems within the baseband subsystem 1110. The baseband subsystem 1110 may also include one or more of an application specific integrated circuit (ASIC) 1132 and a field programmable gate array (FPGA) 1130.

The microprocessor 1120 and memory 1122 provide the signal timing, processing, and storage functions for wireless device 1100. The analog circuitry 1124 provides the analog processing functions for the signals within baseband subsystem 1110. The baseband subsystem 1110 provides control signals to a transmitter 1150, a receiver 1170, a power amplifier 1180, and a switching module 1190, for example.

It should be noted that, for simplicity, only the basic components of the wireless device 1100 are illustrated herein. The control signals provided by the baseband subsystem 1110 control the various components within the wireless device 1100. Further, the function of the transmitter 1150 and the receiver 1170 may be integrated into a transceiver.

The baseband subsystem 1110 also includes an analog-to-digital converter (ADC) 1134 and digital-to-analog converters (DACs) 1136 and 1138. In this example, the DAC 1136 generates in-phase (I) and quadrature-phase (Q) signals 1140 that are applied to a modulator 1152. The ADC 1134, the DAC 1136, and the DAC 1138 also communicate with the microprocessor 1120, the memory 1122, the analog circuitry 1124, and the DSP 1126 via bus 1128. The DAC 1136 converts the digital communication information within baseband subsystem 1110 into an analog signal for transmission to the modulator 1152 via connection 1140. Connection 1140, while shown as two directed arrows, includes the information that is to be transmitted by the transmitter 1150 after conversion from the digital domain to the analog domain.

The transmitter 1150 includes the modulator 1152, which modulates the analog information on connection 1140 and provides a modulated signal to upconverter 1154. The upconverter 1154 transforms the modulated signal to an appropriate transmit frequency and provides the upconverted signal to the power amplifier 1180. The power amplifier 1180 amplifies the signal to an appropriate power level for the system in which the wireless device 1100 is designed to operate.

Details of the modulator 1152 and the upconverter 1154 have been omitted, as they will be understood by those skilled in the art. For example, the data on connection 1140 is generally formatted by the baseband subsystem 1110 into in-phase (I) and quadrature (Q) components. The I and Q components may take different forms and be formatted differently depending upon the communication standard being employed.

The power amplifier 1180 supplies the amplified signal to a front-end module 1162, where the amplified signal is conditioned and filtered by one or more signal conditioning filters for transmission. The front end module 1162 comprises an antenna system interface that may include, for example, the switching module 1190 comprising an embodiment of the switching and signal filtering circuit 400A, 400B configured to switch a signal between the antenna 1160, the receiver 1170, and the power amplifier 1180 (receiving the RF transmit signal from the transmitter 1150), as described herein to implement FDD and TDD in a shared band. In an embodiment, the PA circuitry 1008 comprises the power amplifier 1180. The RF transmit signal is supplied from the front-end module 1162 to the antenna 1160. In an embodiment, the antenna 1160 comprises an FDD/TDD antenna.

In an embodiment, the front-end module 1162 comprises the switching module 1190. In an embodiment, switching module 1190 comprises the switching module 1000 including the semiconductor die 900. In another embodiment, switching module 1190 comprises the switching module 1010 including the filtering semiconductor die 910 and the switching semiconductor die 920. In a further embodiment, the switching module 1190 comprises the multi-chip module 1030 including one or more SAW or BAW filters 930 and the switching semiconductor die 920. In these embodiments, the switching module 1190 comprises an embodiment of the switching and signal filtering circuit 400A, 400B.

A signal received by antenna 1160 will be directed from the front-end module 1162 to the receiver 1170. The receiver 1170 includes low noise amplifier circuitry 1172, a downconverter 1174, a filter 1176, and a demodulator 1178.

If implemented using a direct conversion receiver (DCR), the downconverter 1174 converts the amplified received signal from an RF level to a baseband level (DC), or a near-baseband level (approximately 100 kHz). Alternatively, the amplified received RF signal may be downconverted to an intermediate frequency (IF) signal, depending on the application. The downconverted signal is sent to the filter 1176. The filter 1176 comprises a least one filter stage to filter the received downconverted signal as known in the art.

The filtered signal is sent from the filter 1176 to the demodulator 1178. The demodulator 1178 recovers the transmitted analog information and supplies a signal representing this information via connection 1186 to the ADC 1134. The ADC 1134 converts these analog signals to a digital signal at baseband frequency and transfers the signal via bus 1128 to the DSP 1126 for further processing.

Operation of Switching Circuit

Figure 7:
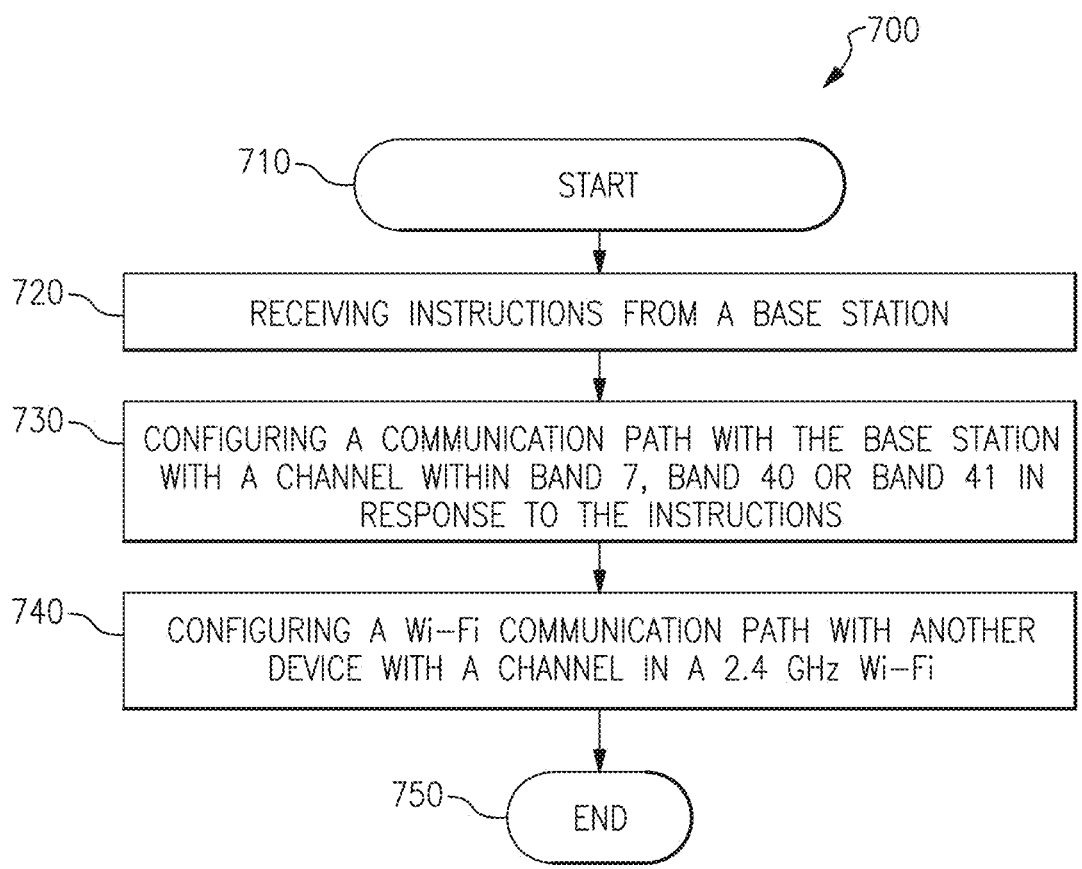
FIG. 7 illustrates a process to set up a path within a wireless device including a switching module, according to certain embodiments.

FIG. 7 illustrates an example process 700 to set up a path within a wireless device including a switching module 400A/400B. The process begins at step 710. The process 700 can begin by a request for connection between the wireless device and a base station. At step 720, the wireless device receives instructions from the base station. The instructions can comprise an indication of a frequency band to be used between the base station and the wireless device. For example, the frequency band is one of B7, B40 and B41. At step 730, the wireless device can configure a communication path between the mobile station and the base station. In an embodiment, a baseband within the wireless device is programmed to use the frequency band within the instructions. For example, the baseband is configured to have the switching module 400A/400B connect the antenna 412A/412B with the corresponding filter for the frequency band. Thus, a signal from the antenna 412A/412B is directed to a receiver circuitry through at least one of the filters 418A, 418B, 420A, 420B, 422A, 422B illustrated in FIGS. 4A and 4B.

At step 740, the wireless device can set up a communication path with another device using Wi-Fi. For example, the wireless device uses screen-sharing function or the wireless device can function as Wi-Fi hot spot or access point. In an embodiment, the wireless device can pick up a channel when the wireless device functions as Wi-Fi hot spot or access point. For example, the wireless device can pick up a channel within Wi-Fi band A or Wi-Fi band B illustrated in FIG. 2. In an embodiment, when the wireless device communicates with the base station with B7 or B41, the wireless device can select Wi-Fi band A. That is to say, the baseband is configured to have the switching module 400A/400B connect the antenna 412A/412B with the Wi-Fi A filter 424A/424B. Thus, a signal from the antenna 412A/412B can be directed to receiver circuitry through at least one of the filters 418A/418B, 422A/422B and a Wi-Fi A filter 424A/424B. When the wireless device communicates with the base station with B40, the wireless device can select Wi-Fi band B. The baseband is configured to have the switching module 400A/400B connect the antenna 412A/412B with the Wi-Fi B filter 426A/426B. Thus, a signal from the antenna 412A/412B is directed to receiver circuitry through the filters 420A/420B and a Wi-Fi B filter 426A/426B. The process 700 ends at step 750.

Figure 8:
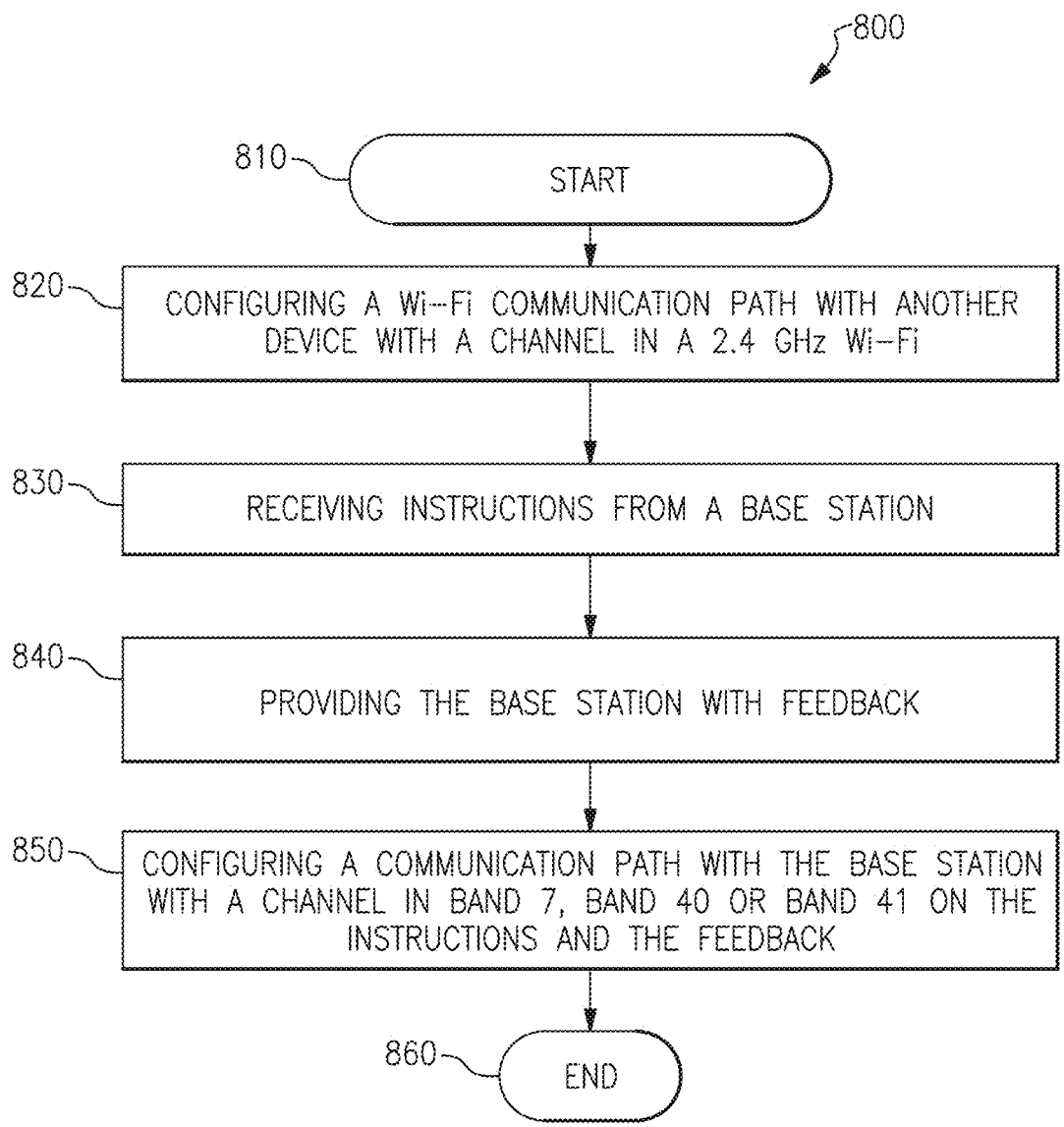
FIG. 8 illustrates a process to set up a path within a wireless device including a switching module, according to certain embodiments.

FIG. 8 illustrates an example process 800 to set up a path within a wireless device including a switching module 400A/400B. The process begins at step 810. At step 820, the wireless device can set up a communication path with another device or a Wi-Fi router using Wi-Fi. Typically, the router picks up a channel between the Wi-Fi router and the wireless device. For example, the Wi-Fi router sends instructions including channel information to the wireless device. The wireless device can communicate with a Wi-Fi router with Wi-Fi A band or Wi-Fi B band based on the channel information and thus, the switching module 400A/400B connects the antenna 412A/412B with at least one of the Wi-Fi A band and Wi-Fi B band. For another example, the wireless device uses screen-sharing function or the wireless device can function as Wi-Fi hot spot or access point. The wireless device can pick up a channel within Wi-Fi A band or Wi-Fi B when the wireless device communicates with another device with Wi-Fi. The switching module 400A/400B can connect the antenna 412A/412B with at least one of the Wi-Fi A band and Wi-Fi B band according to the channel the wireless device pick up. The signal from the antenna 412A/412B can be directed to the selected Wi-Fi filter 424A/424B, 426A/426B.

At step 830, the wireless device can receive instructions from the base station. In an embodiment, the instructions comprise an indication of a frequency band to be used between the base station and the wireless device. For example, the frequency band is one of B7, B40 and B41. At step 840, the wireless device can send feedback to the base station. The feedback can comprise an indication of a frequency band different from that transmitted from the base station. For example, even though the indication of the frequency band from the base station indicates B40 for the communication between the wireless device and the base station, the wireless device can send feedback including an indication of B7 or B41 to the base station for the communication if the wireless device is setting up a path with another device with Wi-Fi A band. For another example, even though the indication of the frequency band from the base station indicates B41 or B7 for the communication between the wireless device and the base station, the wireless device can send feedback including an indication of B40 to the base station for the communication if the wireless device is setting up a path with another device with Wi-Fi B band.

At the step 850, the wireless device can configure a communication path between the mobile station and the base station based on the instructions from the base station and the feedback from the wireless device. The baseband within the wireless device can be configured to have the switching module 400A/400B connect the antenna 412A/412B with the appropriate filter for the frequency band. The signal from the antenna 412A/412B can be directed to receiver circuitry through the filter 420A/420B and a Wi-Fi B filter 426A/426B. Alternatively, the signal from the antenna 412A/412B can be directed to receiver circuitry through at least one of the filters 418A/418B, 422A/422B and a Wi-Fi A filter 424A/424B. The process 800 ends at step 860.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize in view of the disclosure herein.

For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A switching circuit for switching radio frequency signals, comprising:
    a first filter configured to filter first radio frequency signals in a first frequency band that is a first cellular band adjacent to a second frequency band, the second frequency band including a first Wi-Fi region adjacent to the first frequency band and a second Wi-Fi region, the second Wi-Fi region spaced from the first frequency band by at least a portion of the second Wi-Fi region, a second filter configured to filter second radio frequency signals in the second Wi-Fi region, a third filter configured to filter third radio frequency signals in a third frequency band that is a second cellular band adjacent to the second Wi-Fi region and spaced from the first Wi-Fi region by at least a portion of the second Wi-Fi region, and a fourth filter configured to filter fourth radio frequency signals in the first Wi-Fi region, and a plurality of switches configured to concurrently route received radio frequency signals from a common cellular/wireless local area network antenna in either of 1) a first mode through the first and second filters to concurrently pass signal content in the first cellular band and the second Wi-Fi region while blocking signal content in the second cellular band and the first Wi-Fi region or 2) a second mode through the third and fourth filters to concurrently pass signal content in the second cellular band and the first Wi-Fi region while blocking signal content in the first cellular band and the second Wi-Fi region.

2. The switching circuit of claim 1 wherein the received radio frequency signals are one or more of time division duplex signals and frequency division duplex signals.

3. The switching circuit of claim 1 wherein the first region and the second region partially overlap.

4. The switching circuit of claim 3 wherein a frequency range of the partial overlap is approximately 20 MHz.

5. The switching circuit of claim 3 wherein a frequency range of the partial overlap is approximately 40 MHz.

6. The switching circuit of claim 1 wherein the first filter, the second filter, the third filter, and the fourth filter include at least one surface acoustic wave filter or at least one a bulk acoustic wave filter.

7. The switching circuit of claim 1 further comprising a control circuit configured to control the plurality of switches to route the received radio frequency signals from the antenna through either the first and second filters or to route the received radio frequency signals from the antenna through the third and fourth filters.

8. A method of operating a switching circuit, the method comprising:
concurrently routing signals in a first mode from a common cellular/wireless local area network antenna to receiver circuitry through i) a first filter, the first filter being configured to filter a first frequency band that is a first cellular band adjacent to a second frequency band that includes a first Wi-Fi region adjacent to the first frequency band and a second Wi-Fi region, the second Wi-Fi region spaced from the first frequency band by at least a portion of the first Wi-Fi region and ii) through a second filter, the second filter being configured to filter the second Wi-Fi region,
concurrently routing the signals in a second mode from the antenna to the receiver circuitry through i) a third filter configured to filter a third frequency band that is a second cellular band adjacent to the second Wi-Fi region and spaced from the first Wi-Fi region by at least a portion of the second Wi-Fi region, and ii) through a fourth filter configured to filter the first Wi-Fi region, and
receiving a control signal to control the concurrent routing of the signals from the antenna through either the first and second filters to concurrently pass signal content in the first cellular band and the second Wi-Fi region while blocking signal content in the second cellular band and the first Wi-Fi region or the third and fourth filters to concurrently pass signal content in the second cellular band and the first Wi-Fi region while blocking signal content in the first cellular band and the second Wi-Fi region.

9. The method of claim 8 wherein the signals are one or more of time division duplex signals and frequency division duplex signals.

10. The method of claim 8 the first region and the second region partially overlap.

11. The method of claim 8 wherein the first filter, the second filter, the third filter, and the fourth filter include at least one surface acoustic wave filter or at least one bulk acoustic wave filter.

12. A wireless device comprising:
a common cellular/wireless local area network antenna configured to receive and transmit radio frequency signals;
a switching circuit including a first filter configured to filter a first frequency band that is a first cellular band adjacent to a second frequency band, the second frequency band having a first Wi-Fi region adjacent to the first frequency band and a second Wi-Fi region spaced from the first frequency band by at least a portion of the first Wi-Fi region, and a second filter configured to filter the second Wi-Fi region, a third filter configured to filter third radio frequency signals in a third frequency band that is a second cellular band adjacent to the second Wi-Fi region and spaced from the first Wi-Fi region by at least a portion of the second Wi-Fi region, and a fourth filter configured to filter fourth radio frequency signals in the first Wi-Fi region, and
a plurality of switches configured to concurrently route the radio frequency signals from the antenna in either of 1) a first mode through the first and second filters to concurrently pass signal content in the first cellular band and the second Wi-Fi region while blocking signal content in the second cellular band and the first Wi-Fi region or 2) a second module through the third and fourth filters to concurrently pass signal content in the second cellular band and the first Wi-Fi region while blocking signal content in the first cellular band and the second Wi-Fi region.

13. The wireless device of claim 12 the first region and the second region partially overlap.

14. The wireless device of claim 12 wherein the first filter, the second filter, the third filter, and the fourth filter include at least one surface acoustic wave filter or at least one bulk acoustic wave filter.

15. The wireless device of claim 13 wherein a frequency range of the partial overlap is approximately 20 MHz.

16. The switching circuit of claim 13 wherein a frequency range of the partial overlap is approximately 40 MHz.

17. The wireless device of claim 12 further comprising a control circuit configured to control the plurality of switches to concurrently route the received radio frequency signals from the antenna through either the first and second filters or to concurrently route the received radio frequency signals from the antenna through the third and fourth filters.

* * * * *